Figure 1:
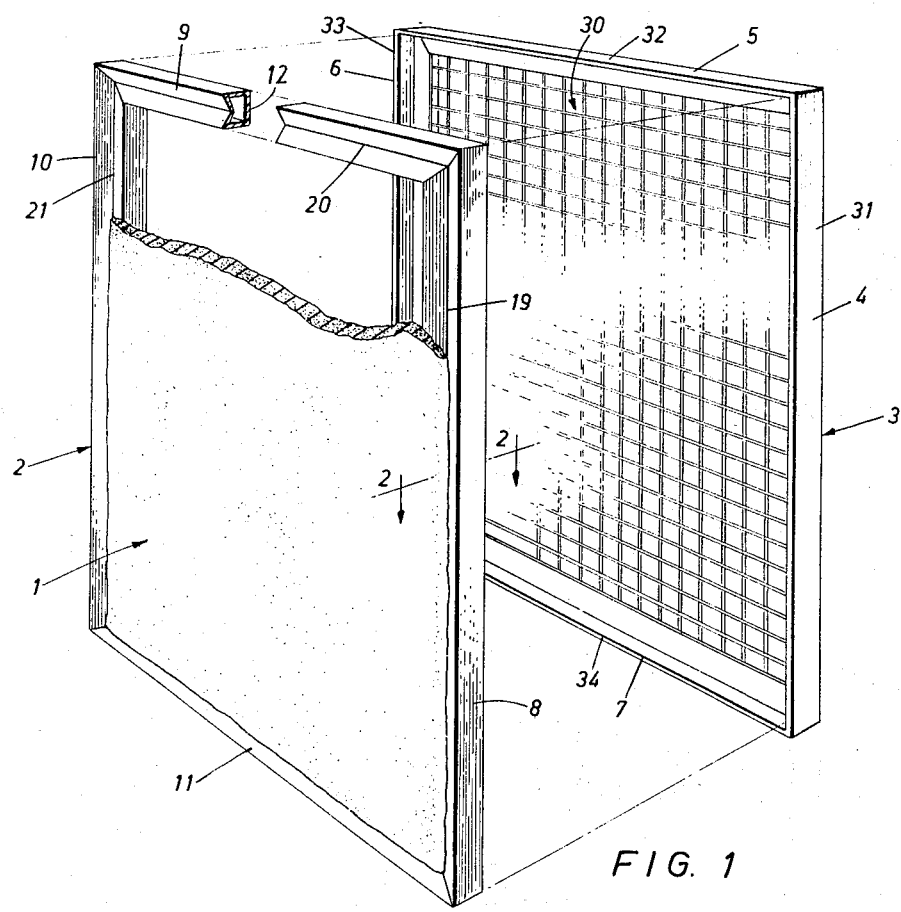

Dec. 27, 1966  J. P. DONACHIUE  3,293,834

FILTER PANEL AND FRAME THEREFOR

Original Filed Sept. 27, 1961

INVENTOR.
JAMES P. DONACHIUE

BY

Attorney

United States Patent Office 3,293,834
Patented Dec. 27, 1966

3,293,834
FILTER PANEL AND FRAME THEREFOR
James Peter Donachiue, Lorne Park, Ontario, Canada, assignor to Bay Distributors Limited, Toronto, Ontario, Canada
Continuation of application Ser. No. 446,473, Mar. 29, 1965, which is a continuation of application Ser. No. 141,095, Sept. 27, 1961. This application Sept. 13, 1965, Ser. No. 491,489
3 Claims. (Cl. 55—501)

This application is a continuation of application, Serial No. 446,473 filed March 29, 1965, now abandoned which was a continuation of my applicatinon Serial No. 141,095 filed September 27, 1961, now abandoned.

This invention relates to air filters and more particularly to air filters employing fibrous batts as the filtering medium and frames for supporting such media.

Most domestic and commercial air conditioning or heating systems now employ filtration units to extract dust and dirt. These units usually have the form of a fibrous filter batt supported at its edges by a rigid frame which is in turn secured in the air duct or over an opening in it. Of these filter units, there are two main types: The first type employs a frame to which the filter medium is temporarily secured to permit easy removal for cleaning or replacement; the second type employs a frame to which the filter medium is permanently secured.

With the first type of filter unit, the filter medium is either removed, cleaned and replaced, or simply discarded and replaced with a new medium depending on the nature of the material. With the second type, the filter medium and frame are usually discarded and replaced with a new filter unit. As a rule, the labour costs of maintaining the first type of filter unit are high mainly due to the time involved and the inconvenient designs of the supporting frames. The labour costs of maintenance are minimized in systems employing the second type of filter, but the costs of replacing the entire unit are, of course, higher.

However, in both types of unit, the supporting frame has usually been made of metal members and the filter medium has been secured to these members by means of tangs or by bending over of the metal members to compressibly secure the filter medium between two opposed surfaces of the frame members. Such structures have usually required fairly complex operations for the fabrication of the frame particularly in these instances where the filter medium and frame are permanently secured. Moreover, under normal operating conditions, the filter medium will flag and this motion together with resultant friction between the medium and the frame frequency causes damage to the batt.

It is accordingly the main object of this invention to provide an improved frame for supporting filter media.

It is another object of this invention to provide an improved frame for the support of a filter medium which permits easy removal of the medium while securing them firmly when in operation.

It is another object of this invention to provide a frame for the support of a filter medium in which the friction between the medium and the frame is minimized.

To achieve these various objects and others which will become apparent as the description proceeds, the inventor provides an air filter having a fibrous filter batt, a surrounding frame comprising a plurality of frame members arranged in a regular geometrical relationship adapted to embrace and securely hold the adjacent marginal edges of the batt, each of said frame members comprises a pair of spaced apart substantially rigid longitudinal side walls, and a pair of longitudinal resilient batt gripping members extending one from each of said side walls toward the opposed side wall whereby the adjacent edge of the batt is securely held therebetween.

Figure 2:
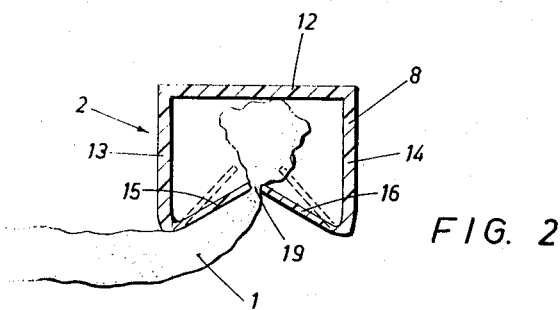

The above and other features of the present invention will be further understood from the following description and drawings in which:

FIGURE 1 is an exploded perspective view of a filter unit embodying the invention; and FIGURE 2 is a section taken along line 2—2 of FIGURE 1.

As shown in FIGURE 1, the filter unit in accordance with the invention comprises a frame 2 for supporting the fibrous filter medium 1 and a second frame 3. The second frame 3 is of conventional structure being comprised of four angles, 4, 5, 6 and 7, arranged and secured to form a rectangular frame and secured between members 4, 5, 6 and 7 is a wire supporting mesh 30. Frame 2 comprises four members, 8, 9, 10 and 11 also arranged to form a rectangular frame, but dimensioned to sit within the side walls of frame 3. These side walls are indicated as 31, 32, 33 and 34. As shown in FIGURE 2, member 8 of frame 2 has a bottom wall 12 and two side walls 13 and 14 which project substantially normally from the lateral edges of bottom wall 12. Walls 12, 13 and 14 are substantially rigid. From adjacent the tops of side walls 13 and 14, two members 15 and 16, which extend continuously throughout the length of walls 13 and 14, project inclinedly into the trough defined by walls 12, 13 and 14. These members 15 and 16 are thinner than walls 12, 13 and 14, are resilient and constitute batt-gripping members. It should also be noted that the lower extremities of members 15 and 16 are spaced apart a short distance to provide a longitudinal slot 19. Frame members 9, 10 and 11 of frame 2 have a similar construction and as will be seen from FIGURE 1, they are suitably fashioned at their ends so that the ends of their respective longitudinal slots such as 19, 20 and 21 are coincident and form a substantially continuous slot in the frame. It should also be noted that the side walls 13 and 14 of member 8 have a greater depth than the height of the side wall 31 of member 4 of frame 3. The remaining members 9, 10 and 11 of frame 2 are also of a greater depth than the corresponding side walls of frame 3.

As will be evident from the hatching of FIGURE 2, the individual frame members of frame 2 are integrally formed, that is, the resilient members 15 and 16 are formed integrally with side walls 13 and 14 which are, in turn, formed integrally with the bottom wall 12. The material used in this particular embodiment is a rigid vinyl although semi-rigid vinyl, A B S copolymer resins, acrylic resins, polyethylene resins, polypropylene or polystyrene or materials having equivalent properties may be used. The frame members such as 8 may be extruded in any conventional normal manner as a continuous tube with the slot such as 19 extending therealong and then cut to the requisite dimensions. It is, of course, essential that the material used should be capable of withstanding the normal operating temperatures of the air conditioning system in which it is to be employed and it has been found that the various types of material which have been mentioned above will withstand temperatures up to 180° F. without the members such as 15 and 16 losing their resilience.

Since side walls 13 and 14 are of a greater height than the depth of their corresponding side wall such as 31, when the batt is properly installed, the only material with which it comes into substantial contact will be the resilient members such as 15 and 16, so that there will be virtually no contact between the filter medium 1 and the metallic frame 3. In this manner, the inventor ensures that there will be a minimum of damage to the filter medium due to its relatively low coefficient of friction with frame 2.

To install the unit, frame 2 is suitably secured to the metallic frame 3 in any convenient manner. In the embodiment now in use, rivets have been employed to secure the bottom walls such as 12 to their corresponding walls on the metal frame 3. These rivets may be easily inserted by passage through the slots such as 19 and in effect through two correspondingly aligned holes in the bottom wall 12 and the corresponding wall of the frame 3.

To install the fibrous batting 1 on the frame the operator initially cuts the batting to the requisite size and then places it so that the marginal edges of the batting overlap the slots such as 19, 20 and 21 of the frame 2. Member 11 of frame 2 also has a slot, but this is not obvious in FIGURE 1 due to the partial installation of the batting 1.

The operator then runs a suitable tool such as a paper wheel over the edge of the fibrous batting. The two resilient members such as 15 and 16 will retreat under the pressure exerted and assume the position indicated in dotted outline in FIGURE 2, slot 19 widens, and the edge of the fibrous batting 1 will pass between arms 15 and 16. As the paper wheel is withdrawn, or moves on, members 15 and 16 will, due to their resilience, revert to substantially their normal attitude and edge of the fibrous batting 1 will be compressibly secured between arms 15 and 16 in the manner shown in FIGURE 2.

It will be appreciated that since the generally channel shaped members 8, 9, 10 and 11 of the frame 2 are disposed so that they face to one side of the plane of the frame, the resiliently spreadable slots such as the slot 19 open to one side of the frame so that when the overlapping edges of the batting 1 are forced or tucked into the slots such tucking is at right angles to the plane of the batting and the frame allowing free use of a tool such as a paper wheel in the tucking operation to tension the batting on the frame 2 without interference from the batting or frame. Further, the gripping of the batting by the resilient members 15 and 16 around the corner from, that is out of the plane of and in a plane parallel to, the plane of the batting gives substantial purchase against accidental withdrawal of the batting from the slots.

It has been found that this structure will secure the fibrous batting most firmly even under conditions of extreme flagging.

To remove the filter medium when dirty, the operator merely pulls the medium 1 from out of the slots in a direction perpendicular to the plane of the batting and frame and due to the relatively smooth edge of these slots, very little of the filter medium will be left on the frame.

It will of course, be understood that various modifications may be made to the structure of the invention which has been described with reference to a specific embodiment without departing from the spirit and scope of the appended claims.

What I claim is:
1. In combination a frame comprising a plurality of hollow frame members connected in end to end relation to form said frame, said frame having first and second opposed substantially planar faces, each of said frame members comprising a bottom wall lying in said first face spaced apart side walls projecting substantially normally from the lateral edges of said bottom wall, the tops of said side walls lying substantially in said second face, wall members each having a free edge and extending from said tops convergently into the space between said side walls and at an angle to each other so that said free edges define a relatively narrow mouth of a slot opening to said second face and extending continuously from one end of each of said frame members to the other, and a flat batt of flexible resiliently compressible filter material substantially thicker in its uncompressed state than the widths of the mouths of said slots disposed as a layer across said second face of said frame and having perimeter portions thereof extending in a direction perpendicular to the plane of said layer and tucked into said hollow frame members through said slot mouth, said perimeter filter material portions being compressed and gripped in a plane parallel to the plane of said layer between said slot mouth defining free edges of said wall members and being relatively uncompressed and of a thickness greater than the width of said slot mouth within said hollow frame members whereby said filter material is releasably secured to said frame, said hollow frame members being substantially rigid with said wall members of each of said frame members having sufficient resilience to resiliently displace relative to each other to open the mouth of the slot formed between the free edges thereof under inward tucking pressure applied to a perimeter portion of said filter batt in a direction substantially perpendicular to said layer to receive said perimeter portion and to displace under a force acting to withdraw such perimeter portion to reduce the mouth of such slot to resist withdrawal of such perimeter portion whereby said batt of filter material may be tensioned across said frame by tucking said perimeter portions into said hollow frame members.

2. The combination as claimed in claim 1 in which each of said hollow frame members is formed of an extruded plastic material and said wall members defining the mouth of the slot in such frame member are thinner than the remainder of such frame member.

3. The combination as claimed in claim 1 in which is provided a second frame of a configuration corresponding to and slightly larger than said first mentioned frame and comprising a plurality of right angled frame members connected in end to end relation to form said second frame with one leg of the angle of each of said right angled frame members extending inwardly of the other leg of the angle forming a perimeteral wall portion of said second frame; said first frame being secured within said second frame and surrounded by the perimeteral wall portions of said second frame with the rear of said first mentioned frame abutting and secured to said inwardly extending angle legs of said second frame members.

References Cited by the Examiner
UNITED STATES PATENTS

| | | |
|---|---|---|
| 377,991 | 2/1888 | Connell. |
| 1,694,089 | 12/1928 | Wright. |
| 2,111,448 | 3/1938 | Hoffman. |
| 2,754,928 | 7/1956 | Hambrecht et al. |
| 2,993,290 | 7/1961 | Bell et al. |
| 3,103,083 | 9/1963 | Seeger _____ 52—63 |
| 3,168,917 | 2/1965 | Bartels. |

FOREIGN PATENTS

| | | |
|---|---|---|
| 1,185,001 | 2/1959 | France. |

HARRY B. THORNTON, *Primary Examiner.*

B. NOZICK, *Assistant Examiner.*